US006463838B2

(12) United States Patent

Hsu

(10) Patent No.: US 6,463,838 B2

(45) Date of Patent: Oct. 15, 2002

(54) BANK CUTTER POSITIONING DEVICE

(76) Inventor: Yuan-Chang Hsu, P.O. Box 26-757, Taipei (TW)

(*) Notice: Subject to any disclaimer, the term of this patent is extended or adjusted under 35 U.S.C. 154(b) by 0 days.

(21) Appl. No.: 09/752,308

(22) Filed: Dec. 29, 2000

(65) Prior Publication Data

US 2002/0083813 A1 Jul. 4, 2002

(51) Int. Cl.[7] .......................... B23D 19/00; B26D 1/14; F16B 21/00

(52) U.S. Cl. ..................... 83/481; 83/508.3; 83/698.31; 403/322.4

(58) Field of Search ............................ 83/508.3, 425.4, 83/498, 499, 481, 698.31, 698.11, 698.41, 698.51; 451/358, 360; 403/322.4

(56) References Cited

U.S. PATENT DOCUMENTS

| | | | | | |
|---|---|---|---|---|---|
| 577,985 | A | * | 3/1897 | Koegel | 83/481 |
| 640,902 | A | * | 1/1900 | Hanson | 83/508.3 |
| 1,107,751 | A | * | 8/1914 | Boyer | 83/508.3 |
| 1,184,853 | A | * | 5/1916 | Hobbs | 83/481 |
| 1,529,640 | A | * | 3/1925 | Hagmaier | 83/508.3 |
| 1,730,196 | A | * | 10/1929 | De Pamphilis | 83/481 |
| 3,905,264 | A | * | 9/1975 | Eddy | 83/481 |
| 4,316,317 | A | * | 2/1982 | Ritzling | 29/468 |
| 4,561,335 | A | * | 12/1985 | Wingen | 83/481 |
| 4,741,234 | A | * | 5/1988 | Colombo | 83/481 |
| 4,827,828 | A | * | 5/1989 | Gurney | 403/322.4 |
| 4,884,046 | A | * | 11/1989 | Spinner | 333/255 |
| 5,058,475 | A | * | 10/1991 | Tidland et al. | 83/481 |
| 5,067,380 | A | * | 11/1991 | Seefeldt | 83/481 |
| 5,551,328 | A | * | 9/1996 | Hsu | 83/425.4 |
| 5,596,918 | A | * | 1/1997 | Longwell et al. | 83/481 |
| 6,155,154 | A | * | 12/2000 | Hsu | 403/322.4 |

* cited by examiner

*Primary Examiner*—Kenneth E. Peterson
*Assistant Examiner*—Jason Prone
(74) *Attorney, Agent, or Firm*—Rosenberg, Klein & Lee

(57) ABSTRACT

A bank cutter positioning device installed in a cutter seat at a side having a dovetail groove comprises a locking block, an elastic element, a roller and a handle. The locking block having an end pivotally installed above the dovetail groove. The elastic element installed between a resisting surface of the seat and a locking block. The roller pivotally at another end of the locking block. Therefore, by moving the handle, the roller of the locking block will move circularly on the sliding surface and curved surface at the lower side of the handle so as to control the releasing and locking operation of the locking block. The roller causes the driving distance between the locking block and the handle to reduce to suit a dovetail seat with a contact surface having a small tilt angle, and has the effects of rapid positioning and detaching.

5 Claims, 5 Drawing Sheets

BANK CUTTER POSITIONING DEVICE

FIELD OF THE INVENTION

The present invention relates to a bank cutter, and especially to a bank cutter positioning device, through the bank cutter on the dovetail seat can be detached rapidly and easily.

BACKGROUND OF THE INVENTION

The bank cutter is a kind of knife for cutting various plastic leather, plastic film or paper, etc. These materials can be cut into a desired width after cutting. Therefore, in general, in a bank cutter, a plurality of cutter are arranged on a dovetail seat in parallel so as to achieve the object of cutting rapidly.

However, for the positioning device of a conventional bank cutter, by screwing a locking block to a dovetail seat, as the bank cutter is assembled or detached, the stud is necessary to be rotated for locking or releasing the locking block, while the operation is time and work consuming. Therefore, in Taiwan Patent Publication No. 396942, "device for rapidly positioning a bank cutter", a bank cutter is disclosed for resolving the prior art defects.

However, in the positioning device of the bank cutter, a linkage is used lock the locking block with a handle. This is because the contact surface between the dovetail seat and the locking block is tilt so as to be suitable. However, so in the specification of the dovetail seat, since the slope of the contact surface is smaller, it is not suitable to use such a positioning device having the linkage.

Therefore, there is an eager demand for a novel bank cutter positioning device which may improve the prior art defects.

SUMMARY OF THE INVENTION

Accordingly, the primary object of the present invention is to provide a bank cutter positioning device installed in a cutter seat at a side having a dovetail groove comprising a locking block, an elastic element, a roller and a handle. The locking block having an end pivotally installed above the dovetail groove. The elastic element installed between a resisting surface of the seat and a locking block. The roller pivotally at another end of the locking block. Therefore, by moving the handle, the roller of the locking block will move circularly on the sliding surface and curved surface at the lower side of the handle so as to control the release and locking of the locking block. The roller causes the driving distance between the locking block and the handle to reduce so as to suit a dovetail seat with a contact surface having a small tilt angle, and has the effects of rapid positioning and detaching.

The various objects and advantages of the present invention will be more readily understood from the following detailed description when read in conjunction with the appended drawing.

DETAILED DESCRIPTION OF THE PREFERRED EMBODIMENTS

Figure 1:
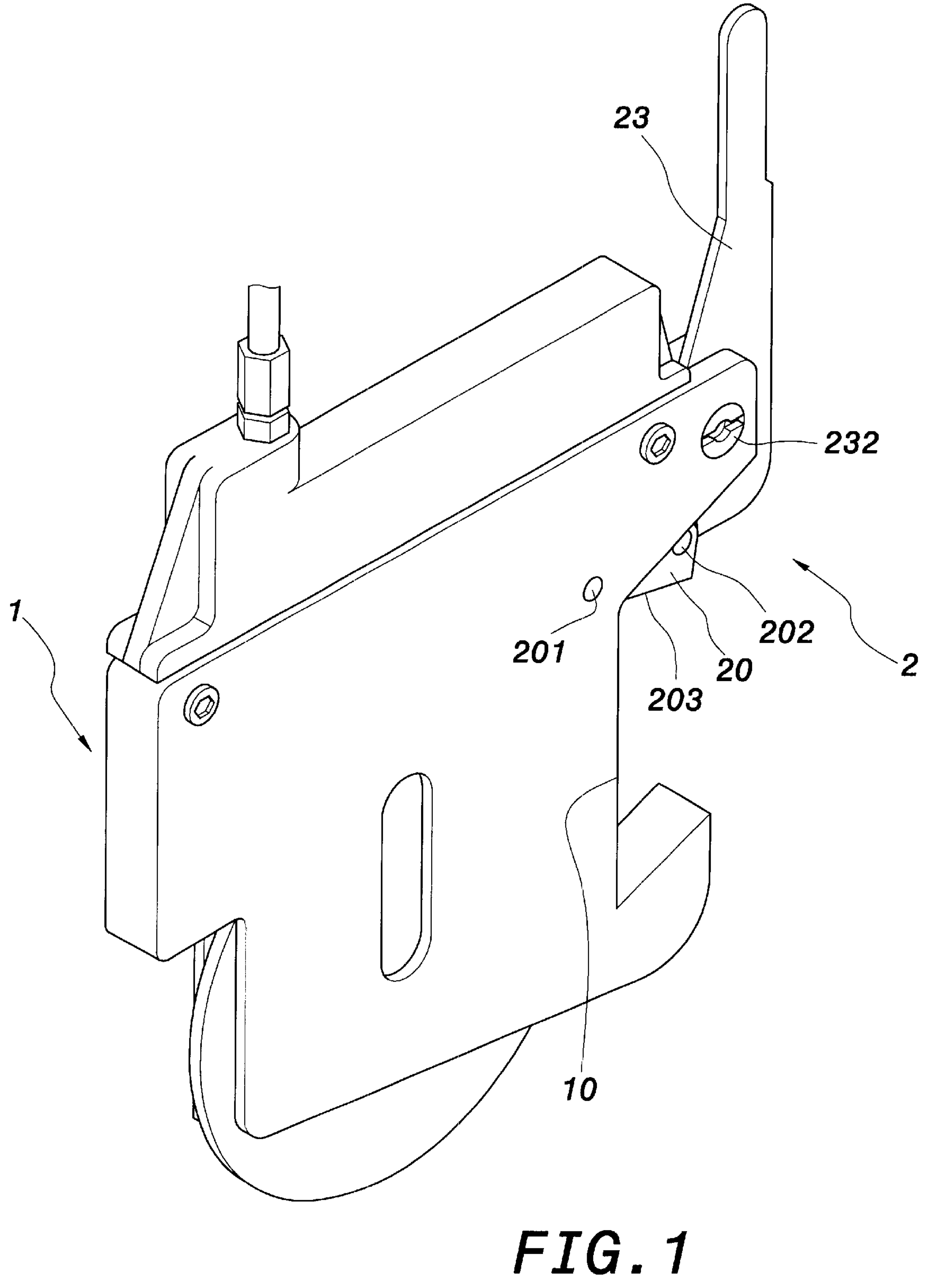
FIG. 1 is an assembled perspective view of the present invention.
Figure 2:
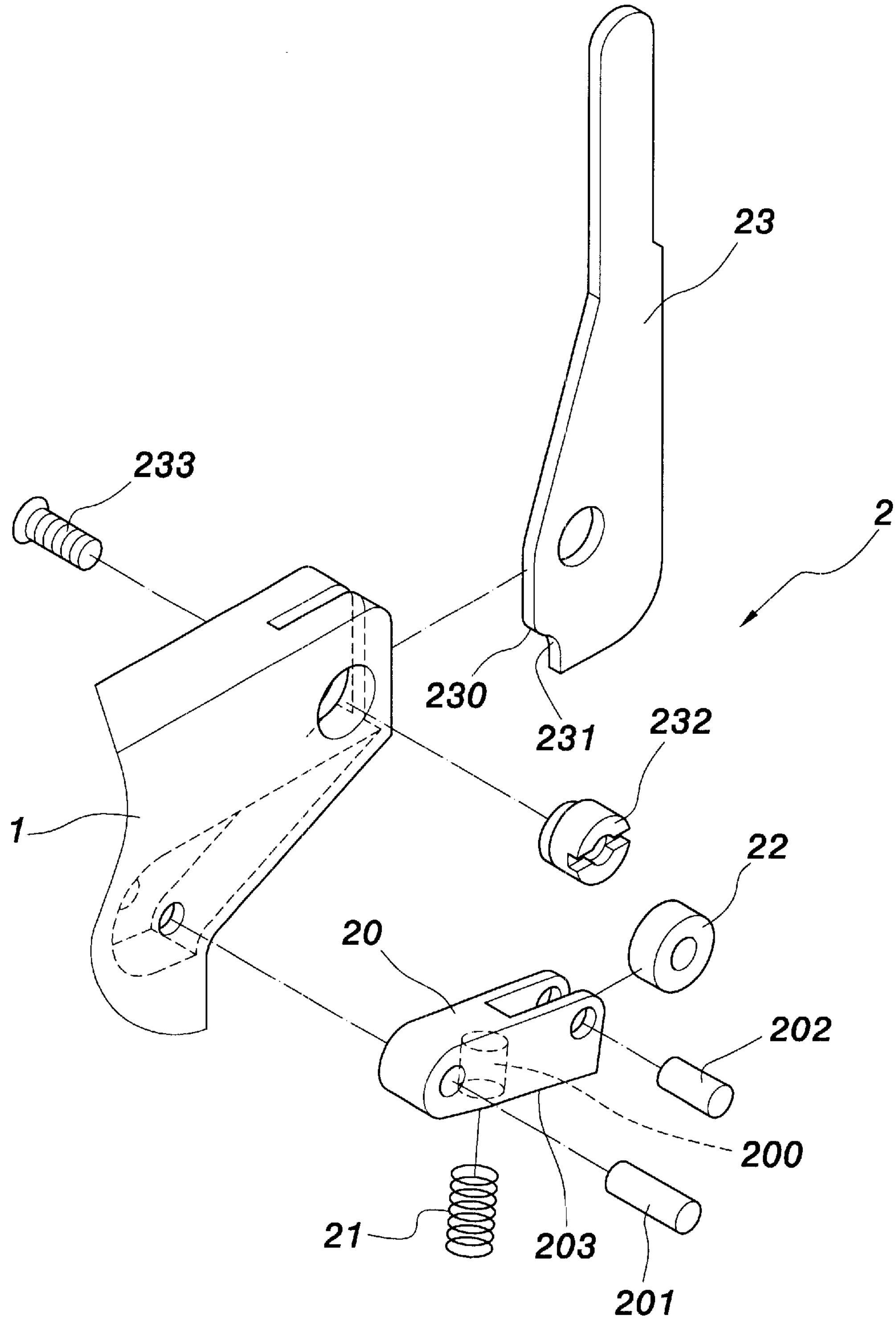
FIG. 2 is an exploded perspective view of the present invention.

Referring to FIGS. 1 and 2, an assembled perspective view and exploded perspective view of the present invention are illustrated. In the present invention, a bank cutter positioning device is illustrated. The bank cutter positioning device is positioned on the seat 1 at the side having a dovetail groove 10. The positioning device 2 has a locking block 20, an elastic element 21, a roller 22, and a handle 23. The locking block 20 is installed above the dovetail groove 10 of the seat 1, and a through hole 200 protruded from the bottom is installed therein. The bottom of the locking block 20 is formed with a contact surface 203. A pivotal shaft 201 serves to pivotally install at one end of the locking block 20 to the seat 1 as a fulcrum so that the locking block 20 may swing upwards and downwards.

The elastic element (a spring) 21 is installed below the locking block 20. The elastic element 21 is received in the through hole 200 of the locking block 20, and the bottom thereof is exposed out of the through hole 200 for resisting against the resisting surface 11 of the seat 1 (referring to FIGS. 3 and 4). By the pushing force of the elastic element 21, the locking block 20 may swing upwards elastically.

Another end of the locking block 20 is pivotally installed with a roller 22 by a pivotal shaft 202. A handle 23 is formed above the locking block 20. The handle 23 is pivotally installed at the lateral side of the seat 1. A lower end of the handle 23 is installed with a sliding surface 230 and a curved surface 231, which is in contact with the roller 22. An eccentric shaft 232 serves to pivotally install the handle 23 to one side of the seat 1. The handle 23 is beneficial to swing by using the eccentric shaft 232 as a fulcrum. It is only necessary to rotate the eccentric shaft 232 to a proper angle, and then, a stud 233 is used to fix it so that the positioning device 2 has the function of adjusting the clamping force of the locking block 20.

Figure 3:
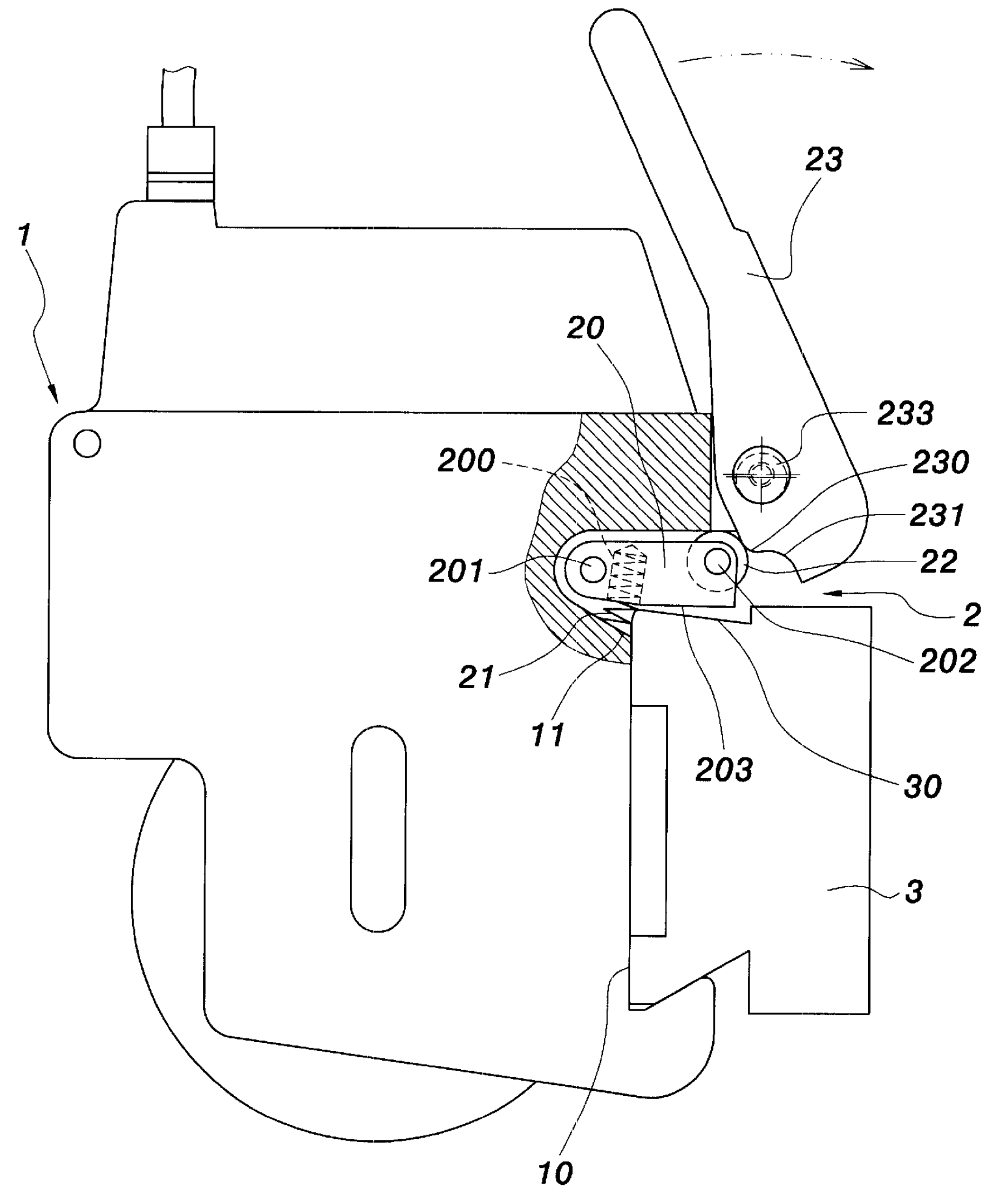
FIG. 3 is a front view showing that the present invention is installed to a dovetail seat in a loose condition.
Figure 4:
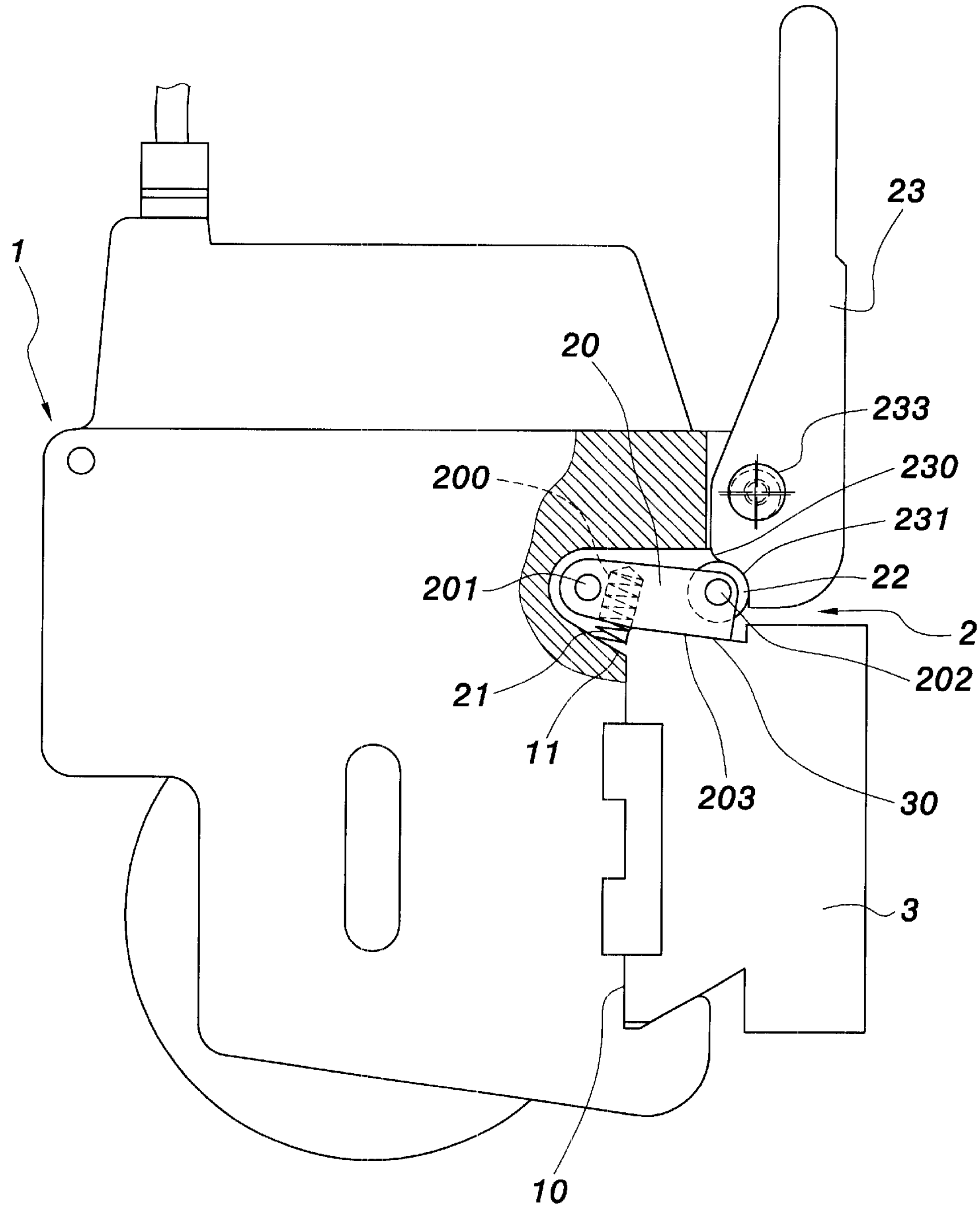
FIG. 4 is a front view showing that the present invention is installed to a dovetail seat in a locking condition.
Figure 5:
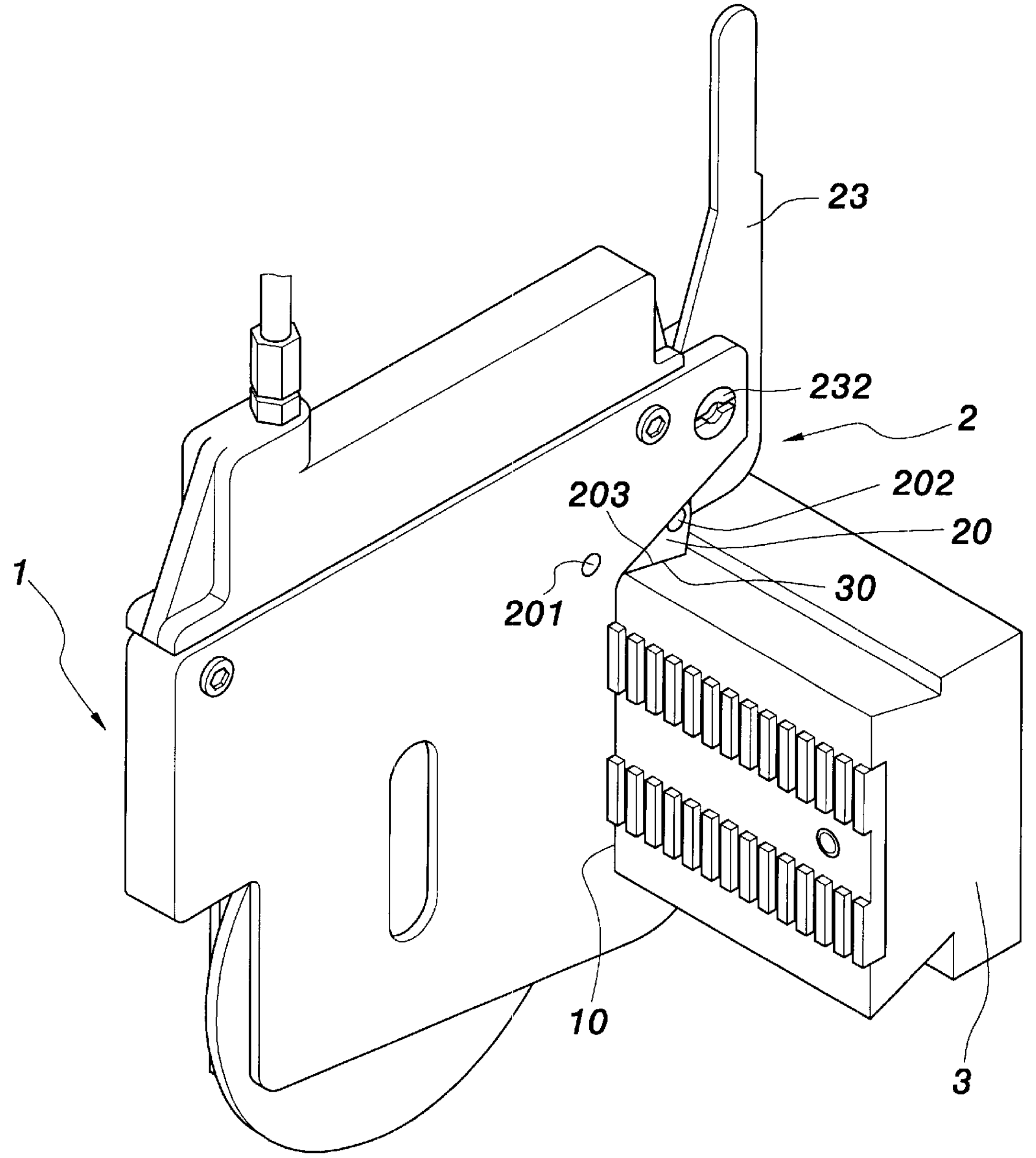
FIG. 5 is a perspective view showing that the present invention is installed to a dovetail seat in a locking condition.

Referring to FIG. 3, in the seat 1, the dovetail groove 10 is across the dovetail seat 3. Then, the seat 1 and dovetail seat 3 are in a loose condition. When the upper end of the handle 23 is moved, since the sliding surface 230 of the handle 23 is in contact with the roller 22, the roller 22 is pushed downwards so that the locking block 20 swings downwards along the fulcrum of the pivotal shaft 201. Furthermore, the roller 22 will circularly rotate along the sliding surface 230. When the roller 22 moves to the curved surface 231, the curved surface 231 generates a downward force to resist against the roller 22. While the contact surface of bottom of the locking block 20 resists against the contact surface 30 of the dovetail seat 3 so that the dovetail seat 3 can be locked and positioned (referring to FIGS. 4 and 5).

In the present invention, the bank cutter positioning device causes the roller 22 to move to the curved surface 231 along the sliding surface 230 of the handle 23. A downward force generated by the curved surface resists against the roller 22. Therefore, the locking block 20 resists against the contact surface 30 of the dovetail seat 3. The roller 22 will reduce the distance between the locking block 20 and the handle 23 so as to be suitable to be used to a dovetail seat 3 having a contact surface 30 with a smaller inclined surface. Therefore, the problem in the prior art is resolved. Moreover, the roller 22 serves to replace the prior art linkage, while the present invention still has the effects of positioning and detaching quickly. By the pushing of the elastic element 21, the contact surface 203 of the locking block 20 will flatly adhere to the contact surface 30 of the dovetail groove 10 so as to effectively prevent that as the locking block 20 is locked, the seat 1 will tilt or improperly positioned.

Moreover, in the present invention, an eccentric shaft 232 serves to pivotally install the handle 23 to the seat 1 so that as being used for a longer period, if the clamping force is insufficient, it is only necessary to rotate the eccentric shaft 232 to a proper angle, and then a stud is used to fix it. Thus, the positioning device 2 has the function of clamping the locking block 20.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bank cutter comprising:

(a) a cutter seat defining a dovetail groove;

(b) a dovetail seat displaceably coupled to said cutter seat, said dovetail seat being received in said dovetail groove;

(c) a locking block coupled to said cutter seat for pivotal displacement between locking and releasing positions, said locking block having first and second end portions and an intermediate portion extending longitudinally therebetween, said first and portion being pivotally coupled to said cutter seat, said second end portion including a pivotally displaceable roller, said locking block in said locking position engaging said dovetail seat for clamping said dovetail seat against said cutter seat, said locking block being resiliently biased to one of said locking and releasing positions; and, (d) a handle pivotally coupled to said cutter seat for displacement between first and second positions about a pivot axis, said handle having a terminal end portion maintaining engagement with said roller of said locking block, said terminal end portion including sliding and curved surfaces for alternatively engaging said roller, one of said sliding and curved surfaces in said first position engaging said roller for retaining said locking block in said locking position thereof, and the other of said sliding and curved surfaces in said second position engaging said roller for retaining said locking block in said releasing position thereof.

2. The bank cutter as recited in claim 1 further comprising an elastic element coupled to said intermediate portion of said locking block for resiliently biasing said locking block relative to said cutting and dovetail seats.

3. The bank cutter as recited in claim 2 wherein said intermediate portion of said locking block has formed therein a hole for receiving a portion of said elastic element, said elastic element resiliently biasing said locking block to said releasing position thereof.

4. The bank cutter as recited in claim 1 further comprising a eccentric shaft for pivotally coupling said handle to said cutter seat, said eccentric shaft being adjustable to displace said pivot axis.

5. The bank cutter as recited in claim 2 further comprising a securing stud releasably coupled to said eccentric shaft.

* * * * *